(12) United States Patent
Doerr

(10) Patent No.: US 7,010,197 B2
(45) Date of Patent: Mar. 7, 2006

(54) INTEGRATEABLE BAND FILTER USING WAVEGUIDE GRATING ROUTERS

(75) Inventor: Christopher Richard Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 156 days.

(21) Appl. No.: 10/657,846

(22) Filed: Sep. 9, 2003

(65) Prior Publication Data

US 2005/0053323 A1    Mar. 10, 2005

(51) Int. Cl.
*G02B 6/34* (2006.01)
(52) U.S. Cl. .............................. 385/37; 385/10; 385/15
(58) Field of Classification Search ................ 385/37, 385/10, 9, 13, 14, 15, 16, 39
See application file for complete search history.

(56) References Cited

U.S. PATENT DOCUMENTS

| 5,488,500 A | * | 1/1996 | Glance ....................... 398/85 |
| 5,745,618 A | * | 4/1998 | Li ............................... 385/46 |
| 6,240,118 B1 | * | 5/2001 | Doerr et al. ................. 372/64 |
| 6,304,350 B1 | * | 10/2001 | Doerr et al. .................... 398/9 |
| 6,400,860 B1 | * | 6/2002 | Chandrasekhar et al. ..... 385/24 |
| 6,519,062 B1 | * | 2/2003 | Yoo ............................ 398/49 |
| 6,603,898 B1 | | 8/2003 | Doerr ......................... 385/24 |
| 2002/0063928 A1 | * | 5/2002 | Hansen et al. .............. 359/130 |

OTHER PUBLICATIONS

C. R. Doerr et al., "Cross-Connect-Type Wavelength Add-Drop Node With Integrated Band Muxes, Interleavers, and Monitor", Opt. Fib. Comm. Conf., Mar. 23, 2003.
C. R. Doerr et al., "Integrated Band Demultiplexer Using Waveguide Grating Routers", IEEE Photonics Technology Letters, vol. 15, No. 8, Aug. 2003.

* cited by examiner

*Primary Examiner*—Kaveh Kianni

(57) ABSTRACT

The inventors propose herein a novel band filter design for planar lightwave circuits. In one embodiment of the present invention, the band filter includes two waveguide grating routers connected by sets of substantially equal path length waveguides within each set separated on one side, wherein the waveguides of each set are formed such that optical signals having overlapping frequency ranges are propagated through adjacent waveguides. In addition, the waveguides of each set are spaced at their connection to the second waveguide grating router such that optical signals with predetermined optical frequency ranges are routed to selected, respective output ports. Some of the advantages of this novel band filter include compactness, sharp passband corners, and a lack of chromatic dispersion.

15 Claims, 4 Drawing Sheets

INTEGRATEABLE BAND FILTER USING WAVEGUIDE GRATING ROUTERS

CROSS-REFERENCE TO RELATED APPLICATIONS

This patent application is related to U.S. Pat. No. 5,745,618 entitled "Optical device having low insertion loss", issued Apr. 28, 1998, which is incorporated herein by reference in its entirety. This patent application is also related to U.S. Pat. No. 6,603,898 entitled "Apparatus and method for achieving a smooth spectral response optical filter", issued Aug. 5, 2003, which is also herein incorporated by reference in its entirety.

FIELD OF THE INVENTION

This invention relates to the field of optical band filters and, more specifically, to integrated optical band filters having reduced ripple.

BACKGROUND OF THE INVENTION

A band filter is a device that is able to separate an incoming optical spectrum into bands (i.e., when used as a demultiplexer) or combine separate optical bands into an output optical spectrum (i.e., when used as a multiplexer), ideally with sharp passband corners. Band filters are useful in both dense (D) and coarse (C) wavelength-division multiplexed (WDM) systems. In DWDM systems, band filters are typically used for de/multiplexing with a high spectral efficiency or for permitting the use of narrowband optical amplifiers, dispersion compensators, add-drop filters, etc. In CWDM systems, band filters are typically used for de/multiplexing without transmitter temperature control.

In current optical systems, a substantial portion of the implemented band filters are based on thin-film interference filters. Thin-film interference filters typically have very low losses however, they require expensive hermetic packages and tedious hand assembly. Thin-film interference filters also typically exhibit significant chromatic dispersion, they require more than ten cavities to achieve sharp passband corners, and they typically require a cascade to demultiplex more than two bands.

Band filters based on bulk gratings have also been proposed. This type of band filters can be dispersion-free and can de/multiplex more than two bands without a cascade, however, they exhibit more loss than their thin-film counterparts. Bulk grating band filters also comprise large form factors, and, like thin-film filters, require expensive hermetic packages and tedious hand assembly.

Finally, band filters based on planar lightwave circuits (PLCs) have also been proposed. Silica waveguide PLCs do not require hermetic packaging and they typically do not require optical alignment (except for an automatable fiber attachment). PLC band filters are capable of being dispersion-free, and they can readily have sharp passband corners. However, the previously proposed band filters based on PLCs (also known as MZI-based filters) become exceedingly large in form factor and are very demanding to de/multiplex more than four bands and/or to achieve sharp passband corners.

SUMMARY OF THE INVENTION

The present invention advantageously provides a compact easy to fabricate reduced ripple band filter that is capable of being constructed in planar lightwave circuit (PLC) technology.

In one embodiment of the present invention, a band filter of the present invention includes two waveguide grating routers (WGRs) connected by a plurality of waveguides having substantially equal path lengths within each set. The connecting waveguides are spaced at their connection to each waveguide grating router such that optical signals having overlapping frequency ranges are propagated through adjacent waveguides and such that optical signals with predetermined optical frequency ranges are routed to selected, respective output ports. In one embodiment of the present invention, each of the sets of connecting waveguides are contiguous at their connection to a first waveguide grating router and have increased gaps between bands at their connection to a second waveguide grating router.

In an alternate embodiment of the present invention, a planar lightwave circuit includes at least two substantially identical band filters of the present invention constructed on a single chip to save cost. In one embodiment, the planar lightwave circuit has a size equal to 8.7 cm×1.0 cm.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Although various embodiments of the present invention herein are being described with respect to a 1×3 optical band filter, it will be appreciated by those skilled in the art informed by the teachings of the present invention that the concepts of the present invention are applicable to band filters comprising substantially any number or combination of inputs and outputs.

Figure 1:
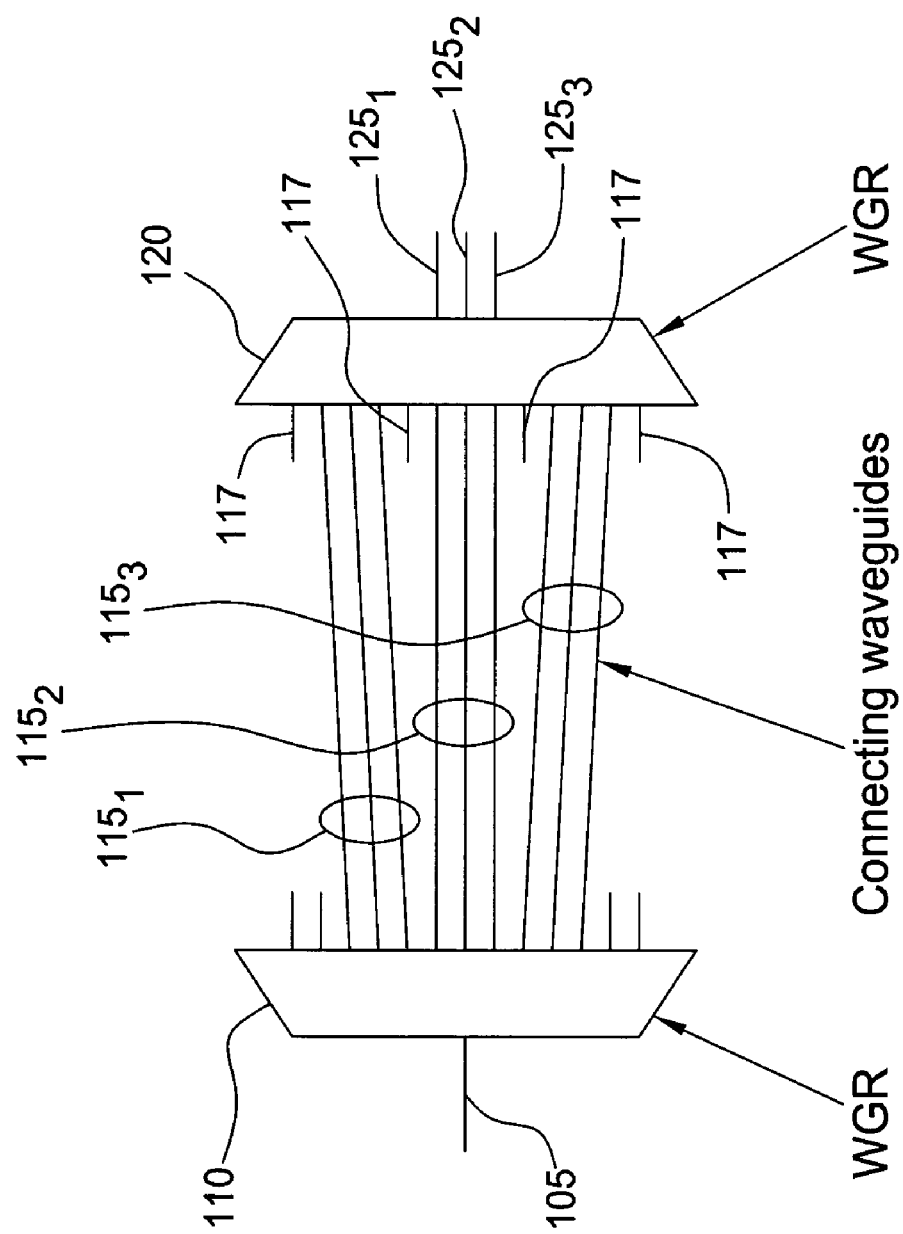
FIG. 1 depicts a high level block diagram of one embodiment of a band filter in accordance with the present invention.

FIG. 1 depicts a high level block diagram of one embodiment of a band filter in accordance with the present invention. The band filter 100 of FIG. 1 illustratively comprises one input waveguide 105, an input waveguide grating router (WGR) 110, a plurality of connecting waveguides 115, a plurality of dummy waveguides 117, an output WGR 120 and three output waveguides 125₁, 125₂ and 125₃ (collectively output waveguides 125). Although in FIG. 1, the band filter 100 is being depicted and described as comprising one input waveguide 105 and three output waveguides 125₁, 125₂ and 125₃ and as such functioning as a demultiplexer, a band filter in accordance with the present invention may also be used in reverse (i.e., using the three waveguides 125₁, 125₂ and 125₃ as the input and the one waveguide 105 as the output) and function as a multiplexer.

The band filter 100 of the present invention is a novel arrangement of two substantially perfectly sampled waveguide grating routers (WGRs). Such sampling is described in U.S. Pat. No. 6,603,898 entitled "Apparatus and method for achieving a smooth spectral response optical filter", issued Aug. 5, 2003 to Christopher R. Doerr, which is herein incorporated by reference in its entirety. Briefly stated, the design technique minimizes the loss and ripple in the spectral response of an optical filter formed using a pair of gratings connected by an array of optical elements. The smoothest spectral response is achieved for a given set of connecting waveguides by choosing the number of grating arms less than or equal to filling the star coupler central Brillouin zone made by the set of connecting waveguides resulting in the connecting waveguides neither substantially over- or under-sampling the optical spectrum from the waveguide gratings. Exactly filling the Brillouin zone with the grating arms minimizes the loss, and so is the preferred choice.

Referring back to FIG. 1, the plurality of connecting waveguides are illustratively divided into three sets of waveguides 115₁, 115₂ and 115₃. Each of the sets 115₁, 115₂ and 115₃ of the plurality of connecting waveguides 115 of the band filter 100 have substantially equal path lengths within a wavelength band. More specifically, a band filter in accordance with the present invention comprises a number of individual sets of connecting waveguides at least equal to the number of bands that an input optical spectrum is to be separated into by the band filter. Each of the sets 115₁, 115₂ and 115₃ of the plurality of connecting waveguides 115 are comprised of waveguides having substantially equal path lengths within the specific wavelength band that they are intended to separate and propagate. In FIG. 1, for simplifying the diagram, the upper set of connecting waveguides 115₁ is depicted as being curved, the center set of connecting waveguides 115₂ is depicted as being straight, and the lower set of connecting waveguides 115₃ is depicted as being curved.

The inlets of the connecting waveguides 115 are continuous at their connection to the left-side WGR 110 and have gaps between bands at their connection to the right-side WGR 120. Illustratively, the left-side WGR 110 has one input waveguide, and the right-side WGR 120 has as many output waveguides as there are bands (illustratively 3 output waveguides). The output waveguides 125 are spaced by the size of the gaps minus one waveguide spacing, multiplied by the lensing magnification factor of the right-side WGR 120. Except at the gaps between the connecting waveguide sets, the connecting waveguides 115 perfectly, or slightly oversample the WGR 120 spectra. More specifically, the connecting waveguides are positioned and formed such that optical signals having overlapping frequency ranges are propagated through adjacent waveguides. As such, the number of waveguide grating arms in each WGR 110, 120 is approximately equal to or less than the number of connecting waveguides it would take to fill one WGR diffraction order. This allows the transmissivity through the band filter 100 within a band to be ripple-free. It should be noted that, for optimum performance, the gaps between the bands of connecting waveguides should be an integer number of the connecting waveguide inlet spacing such that the dummy waveguides 117 inserted in the gaps are able to make the mutual-coupling-induced aberrations for all connecting waveguide inlets substantially identical. However, the gaps do not have to be an integer of inlet spacing in order for the band filter to operate properly.

Figure 2:
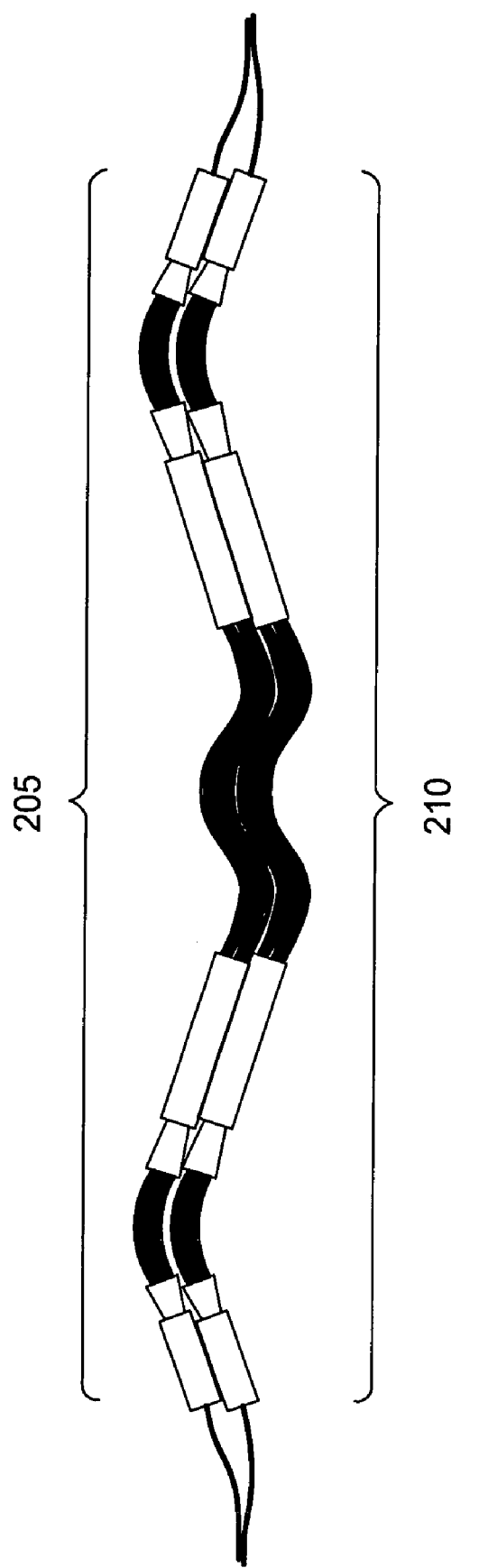
FIG. 2 depicts a more detailed diagram of the band filter of FIG. 1 constructed on a single chip in planar lightwave circuit (PLC) technology.

FIG. 2 depicts a more detailed diagram of the band filter 100 of FIG. 1 constructed on a single chip in silica-on-silica PLC technology. FIG. 2 illustratively depicts two substantially identical band filters 205, 210, such as the band filter 100 of FIG. 1. In FIG. 2, two band filters 205, 210 are depicted as being constructed on the single chip to save packaging costs and because a multiplexer and demultiplexer are often needed in the same location. The band filters 205, 210 of FIG. 2 are illustratively depicted as functioning as band demultiplexers. The band demultiplexers 205, 210 in FIG. 2 share fiber assemblies in order to save cost. The size of the PLC chip of FIG. 2 is 8.7 cm×1.0 cm. Each of the band demultiplexers 205, 210 in FIG. 2 splits the center (C) and long (L) optical band into five 17-channel (100-GHz-spacing) bands with dead zones of 3 channels (i.e., it is a 17-skip-3 filter). Each band has 10 connecting waveguides (200-GHz spacing), and the gaps between bands at their connection to the output WGR are 4 spacings (i.e., 3 dummy waveguides between bands). The output of the output WGR has 5 output waveguides spaced by 3 inlet spacings. There are illustratively, M=75 arms in each WGR, and the WGR free-spectral range is 15200 GHz. The spectral sampling coefficient, s, for the connecting waveguides is characterized according to equation one (1), which follows:

$$s = \frac{R}{Ma}\frac{\lambda}{n_{fs}b}. \tag{1}$$

In equation (1) above, R depicts the radius of the free-space region from which the connecting waveguides emanate, λ depicts the wavelength, $n_{fs}$ is the effective refractive index of the free-space region, M is the number of arms in each WGR, a is the center-to-center spacing between grating inlets at the free-space region, and b is the center-to-center spacing between connecting waveguide inlets at the free-space region. For each of the demultiplexers 205, 210 depicted in FIG. 2, the spectral sampling coefficient, s, for the connecting waveguides ranges from 1.07 to 1.01 from the shortest to the longest wavelength. In comparison, a conventional Gaussian-passband WGR demultiplexer has spectral sampling coefficient of s≈0.5. A spectral sampling coefficient of s≧1 results in a substantially ripple-free passband. The values of λ, $n_{fs}$, and b vary from connecting waveguide to connecting waveguide.

It should be noted that the increased gap between the connecting waveguides at the band boundaries in a band filter may cause the outermost waveguides in each band to experience a slightly different amount of etching during the core definition, which results in these waveguides being no longer perfectly in phase with their neighboring waveguide in the band. This results in ripples at the band edges. To avoid this, in a band filter of the present invention, dummy waveguides are located within the gaps as much as possible while avoiding mutual coupling once the waveguides start bending. Based on simulation results, the waveguide grating arm lengths were adjusted in the design to minimize aberrations due to the connecting waveguide inlet mutual coupling.

To mitigate loss, segmentation is used in the six inner slab-to-waveguide-array junctions. Segmentation is the placement of strips of core running perpendicular to the waveguides with an approximately constant center-to-center spacing but a progressively decreasing width as the distance from the free-space region increases. Such segmentation is described in U.S. Pat. No. 5,745,618 entitled "Optical device having low insertion loss", issued Apr. 28, 1998 to Yuan P. Li, which is herein incorporated by reference in its entirety.

Also, to mitigate fabrication and polarization sensitivities, within each connecting waveguide set, the sum of the lengths of the straight waveguides, the sum of the lengths of the transitions between straight waveguides and curved waveguides, and the sum of the lengths of the curved waveguides (all having the same bend radius) are all individually kept constant from waveguide to waveguide.

In an experiment, the inventor manufactured a PLC chip, such as the PLC chip depicted in FIG. 2, using low-pressure chemical vapor phase deposition (LPCVD) and reactive ion etching. The PLC chip was diced out, and fiber ribbon assemblies were glued to both sides. Despite the above-mentioned efforts to make the immediate environment for the outermost waveguides in each band the same as the inner ones, the inventor determined after manufacture that the outermost waveguides were slightly too long in path length and an ~0.8 dB ripple was observed on the long-wavelength edge of each band. The inaccuracy was measured by using small chrome heaters on every connecting waveguide. By driving the heaters, it was determined that the outermost waveguides were slightly long in path length. A possible explanation is that the waveguide density is higher for the inner waveguides, and thus there is more etchant available there, causing increased undercutting during the core definition. The outermost waveguides, having less undercutting, would have slightly higher propagation constants, appearing to have longer path lengths.

To adjust the path lengths of the PLC chip, the respective chrome strips were hyperheated (heating up the waveguides to a temperature high enough to modify the glass) to permanently readjust the path lengths, significantly reducing the ripple. Because this ripple is consistent from device to device and wafer to wafer, it could be corrected in future manufacture and design by slightly shortening the outermost connecting waveguides in each band.

Figure 3:
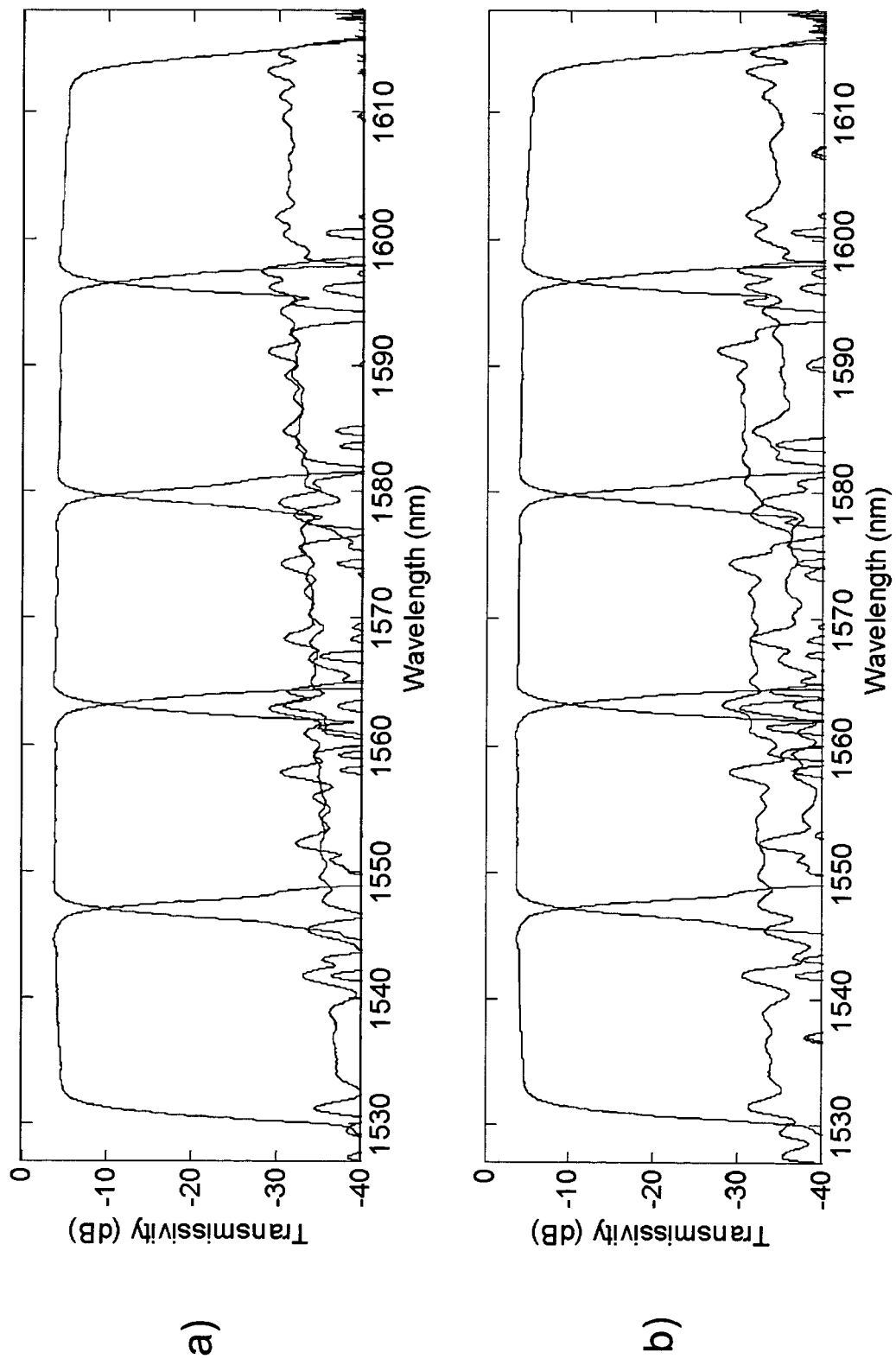
FIG. 3a graphically depicts the measured transmissivities for the upper band demultiplexer of the PLC chip of FIG. 2.
FIG. 3b graphically depicts the measured transmissivities for the lower band demultiplexer of the PLC chip of FIG. 2.

FIG. 3a and FIG. 3b graphically depict the measured transmissivities for the upper 205 and the lower 210 band demultiplexers, respectively, of the PLC chip of FIG. 2. In FIGS. 3a and 3b, the transmissivity of the respective band demultiplexer is plotted versus wavelength. From FIGS. 3a and 3b, it is evident that the connecting waveguides are adapted to provide low-loss propagation of optical signals within one or more predetermined optical frequency ranges. The insertion loss (fiber-to-fiber, including one connector) is <4.0 dB for the center bands, <5.0 dB for the low-wavelength band, and <5.5 dB for the long-wavelength band. The polarization-dependent loss is <0.15 dB. The 0.3-dB bandwidth is 1670 GHz, and the 20-dB bandwidth is 2210 GHz, giving a shape factor ($BW_{20\ dB}/BW_{0.3\ dB}$) of 1.32. This filter is designed as a 17-skip-3 filter, but with this shape factor it is good enough to be a 5-skip-0 filter. More specifically, the filter shape of the present invention is appropriate to have 5 channels per band with one wavelength channel position that cannot be used between bands. A highly desirable band filter is an N-skip-0 filter. In such a case, no wavelength channel positions are lost. The present invention may be used to create a filter, such as an 8-skip-0 filter.

Figure 4:
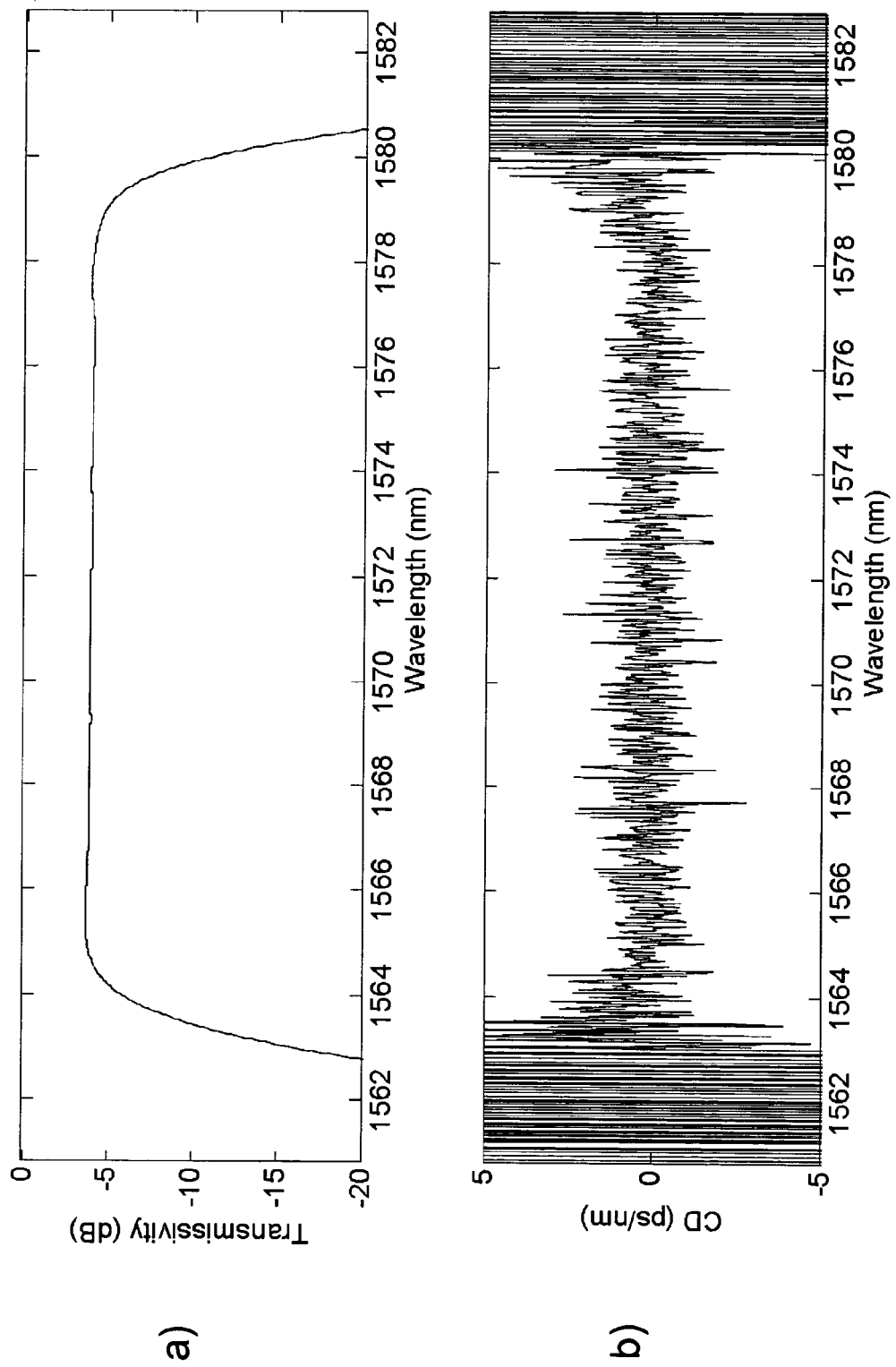
FIG. 4a graphically depicts the measured transmissivity of the central band of the lower band demultiplexer of the PLC chip of FIG. 2.
FIG. 4b graphically depicts the chromatic dispersion of the central band of the lower band demultiplexer of the PLC chip of FIG. 2.

FIG. 4a and FIG. 4b graphically depict the measured transmissivity and chromatic dispersion, respectively, of the central band of the lower band demultiplexer 210 of the PLC chip of FIG. 2. The chromatic dispersion magnitude for the lower band demultiplexer 210 is extremely small, <1 ps/nm across a band. The adjacent band crosstalk is <–23 dB, and the nonadjacent band crosstalk is <–34 dB. The adjacent crosstalk is relatively high because all the bands, after being split apart by the connecting waveguides, reenter a single WGR. Assuming an optical signal propagating from left to right through the device, adjacent bands are focused onto the output waveguides in the right-side WGR, which are relatively closely spaced. Errors in the right-side WGR will cause sidelobes that look like the adjacent bands. Assuming an optical signal propagaing from right to left, adjacent bands are focused slightly off from the input waveguide, however these bands are shifted away from the band by the gap spacing. Thus errors in the left-side WGR cause sidelobes that also look like the adjacent bands but shifted by the gap spacing. Nevertheless, with better mutual-coupling-induced aberration correction and improved process control, an adjacent crosstalk <–30 dB is achievable.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A band filter, comprising:
   a first waveguide grating router;
   a second waveguide grating router; and
   a plurality of waveguides connecting the first waveguide grating router to the second waveguide grating router;
   wherein the connecting waveguides comprise one or mare sets of waveguides and wherein the waveguides of each set are spaced at their connections to the first waveguide grating router such that optical signals having overlapping frequency ranges are propagated through adjacent waveguides and the waveguides of each set are spaced at their connection to the second waveguide grating router such that optical signals with predetermined optical frequency ranges are routed to selected, respective output ports.

2. The band filter of claim 1, wherein each set of waveguides contains two or more waveguides having path lengths that are substantially equal to within a few wavelengths, and wherein the waveguides are spaced at their connection to each waveguide grating router such that the waveguides substantially spectrally perfectly sample or over-sample the waveguide grating routers.

3. The band filter of claim 1, wherein the connecting waveguides are positioned at their connections to the first waveguide grating router and the second waveguide grating router to optimize the low-loss propagation of optical signals within one or more predetermined optical frequency ranges.

4. The band filter of claim 1, wherein each of the sets of connecting waveguides are contiguous at their connection to the first waveguide grating router and have increased gaps between bands at their connection to the second waveguide grating router.

5. The band filter of claim 4, wherein output waveguides of the band filter are spaced by the size of the gaps of the connection to the second waveguide grating router minus one waveguide spacing, multiplied by the lensing magnification factor of the second waveguide grating router.

6. The band filter of claim 5, wherein the number of waveguide grating arms in the first waveguide grating router and the second waveguide grating router is substantially equal to or less than the number of connecting waveguides it takes to fill one diffraction order of the first or the second waveguide grating router.

7. The band filter of claim 4, further comprising dummy waveguides inserted in the gaps.

8. The band filter of claim 7, wherein the gaps between the bands of the connecting waveguides are substantially equal to an integer number of the connecting waveguides inlet spacing such that the dummy waveguides inserted in the gaps are able to make the mutual-coupling-induced aberrations for all connecting waveguide inlets substantially identical.

9. The band filter of claim 1, wherein the number of sets of connecting waveguides is equal to the number of bands an input signal is separated into by the band filter.

10. The band filter of claim 9, wherein said band filter comprises three sets of connecting waveguides and three output waveguides.

11. The band filter of claim 1 wherein said band filter is integrated onto a single planar lightwave circuit chip.

12. A planar lightwave circuit, comprising at least two substantially identical band filters, such as the band filter of claim 11, constructed on a single chip.

13. The planar lightwave circuit of claim 12, wherein the size of the planar lightwave circuit chip is equal to 8.7 cm×1.0 cm.

14. The band filter of claim 1, wherein the connecting waveguides comprise a spectral sampling coefficient ranging from 1.07 to 1.01, from the shortest to the longest wavelength, respectively.

15. The band filter of claim 1, wherein said first waveguide grating router, said second waveguide grating router and said plurality of connecting waveguides are integrated on a single planar lightwave circuit.

* * * * *